Nov. 7, 1967    R. J. HOOKER    3,351,394
HYDROSTATIC BEARINGS FOR A ROTATABLE ELEMENT
Filed Jan. 7, 1965    5 Sheets-Sheet 1
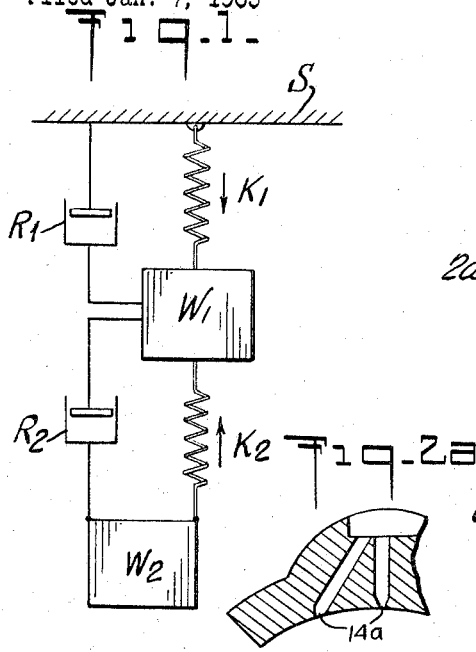
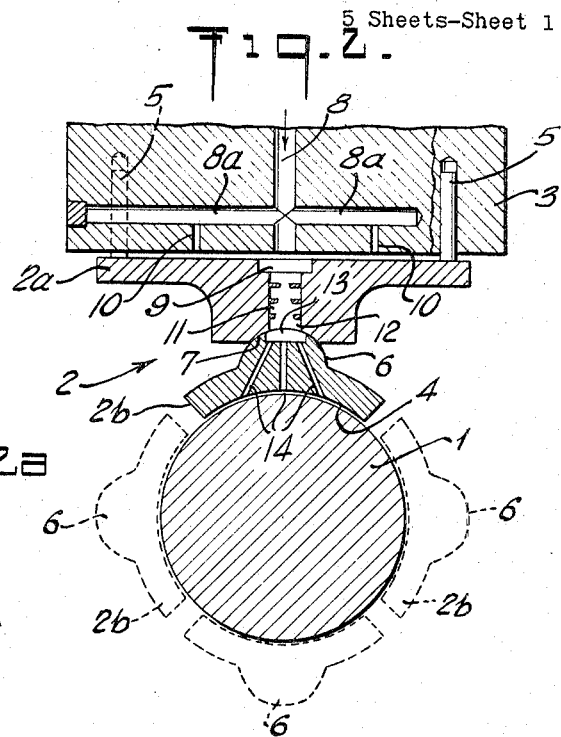
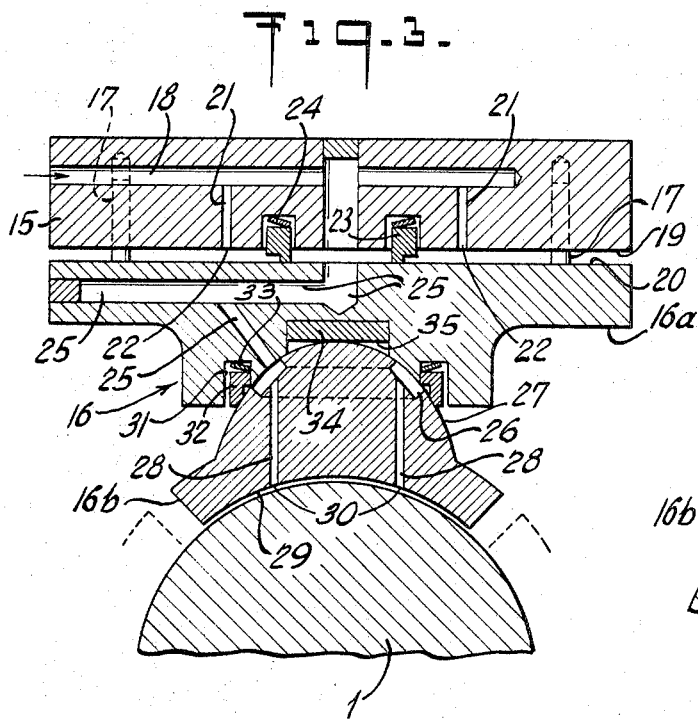
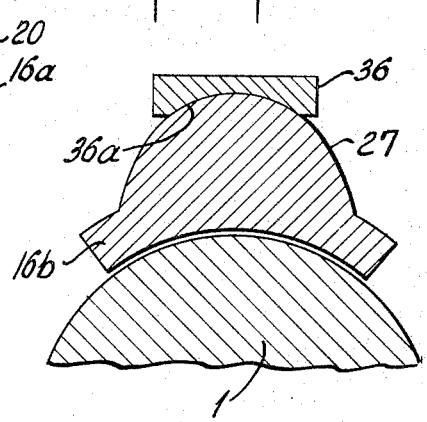
INVENTOR.
RALPH J. HOOKER
ATTORNEY

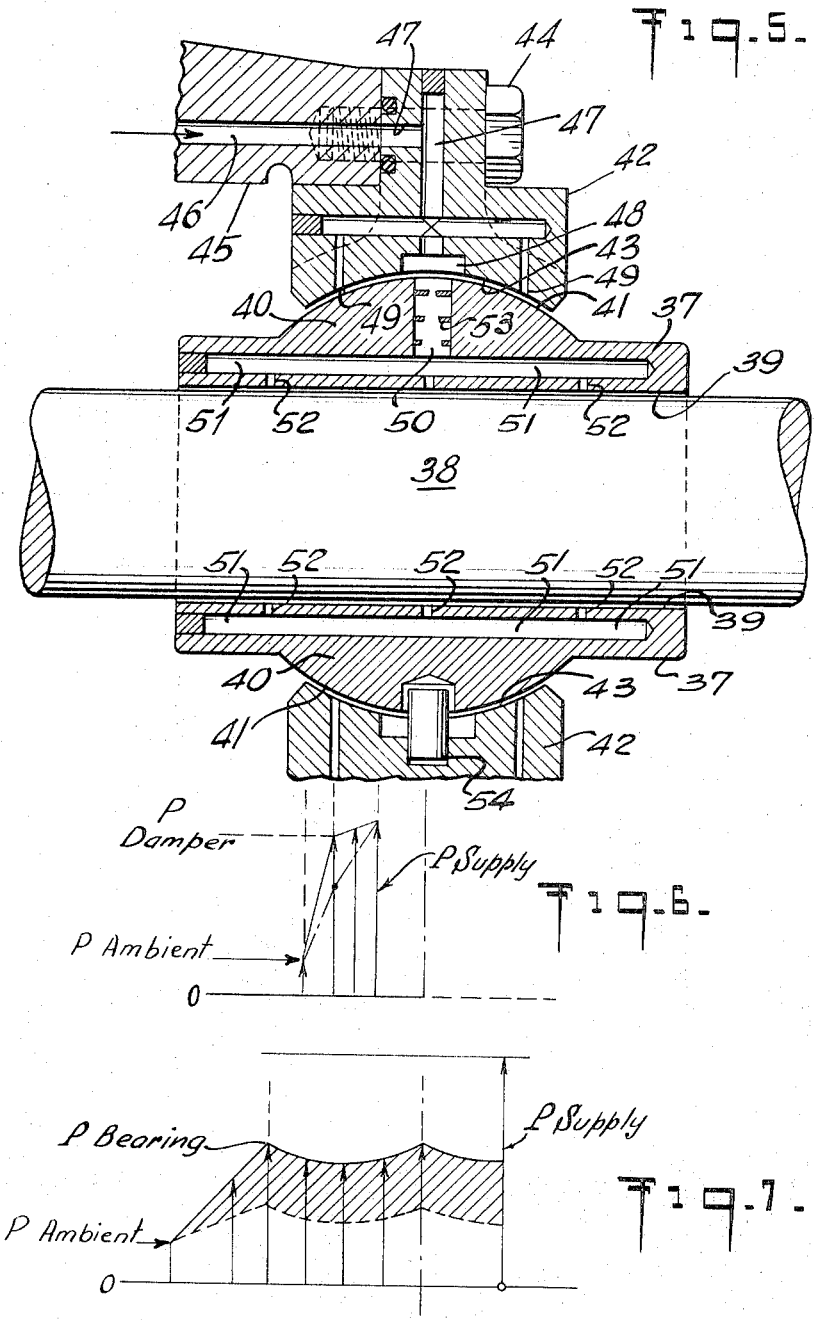

Nov. 7, 1967  R. J. HOOKER  3,351,394
HYDROSTATIC BEARINGS FOR A ROTATABLE ELEMENT
Filed Jan. 7, 1965  5 Sheets-Sheet 3
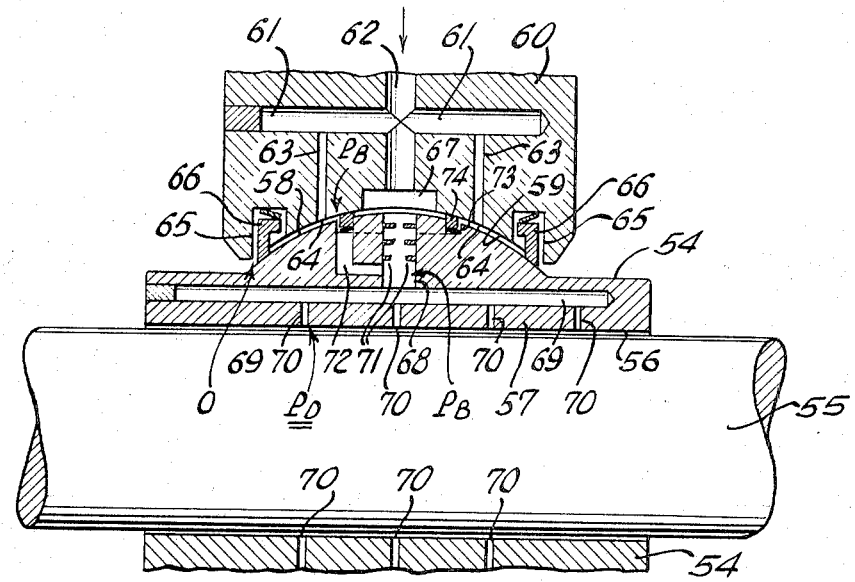
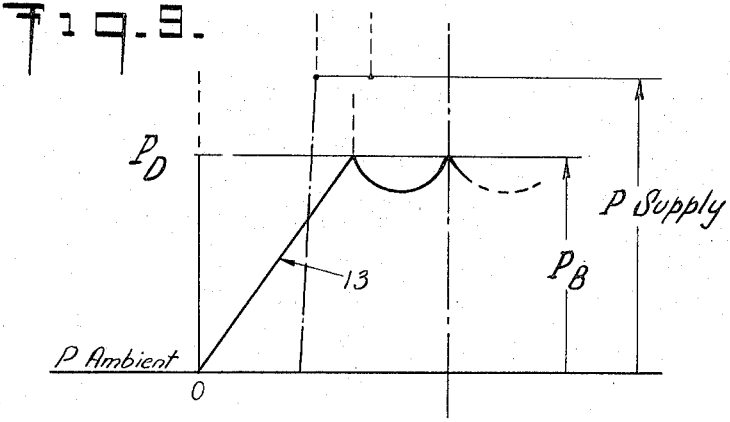
INVENTOR.
RALPH J. HOOKER
ATTORNEY

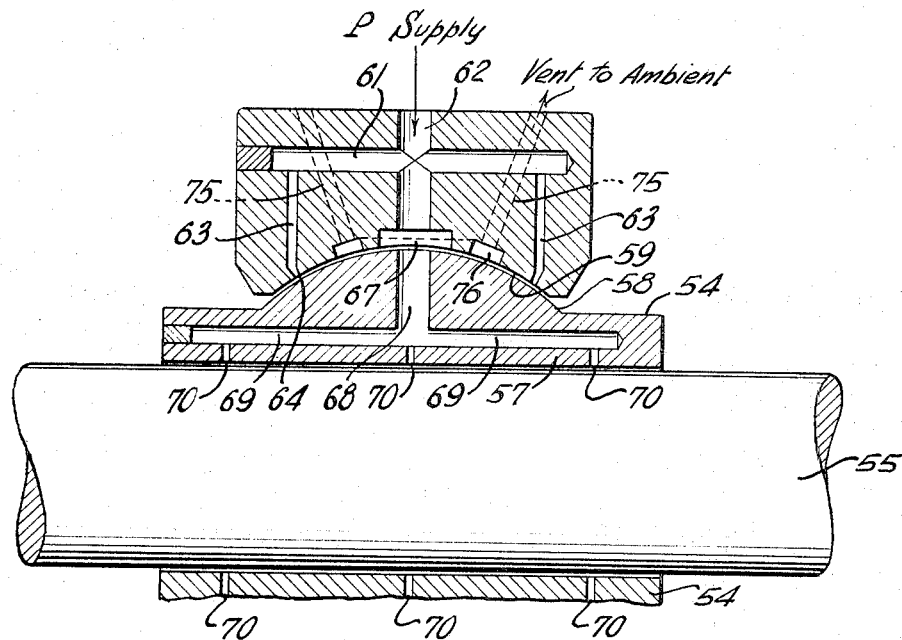
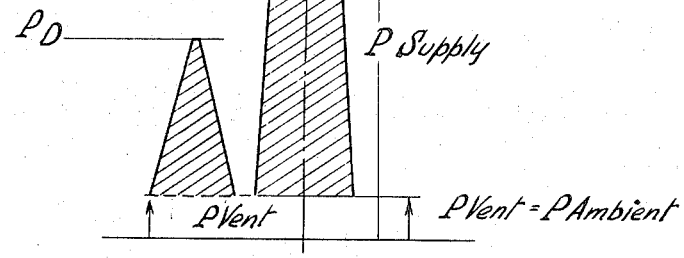

Nov. 7, 1967  R. J. HOOKER  3,351,394
HYDROSTATIC BEARINGS FOR A ROTATABLE ELEMENT
Filed Jan. 7, 1965  5 Sheets-Sheet 5

INVENTOR.
RALPH J. HOOKER
ATTORNEY

United States Patent Office 3,351,394
Patented Nov. 7, 1967

3,351,394
HYDROSTATIC BEARINGS FOR A
ROTATABLE ELEMENT
Ralph J. Hooker, Schenectady, N.Y., assignor to Mechanical Technology Incorporated, a corporation of New York
Filed Jan. 7, 1965, Ser. No. 424,070
18 Claims. (Cl. 308—9)

ABSTRACT OF THE DISCLOSURE

A hydrostatic bearing designed to damp the vibrations produced by a rotating shaft. The bearing includes bearing pads spaced peripherally around the shaft. Intermediate bearing sections are interposed between each of the pads and a housing or support to form the complete bearing unit. Each of the support, bearing sections and pads have gas or liquid passageways which serve to supply a fluid from a source, through the support to the space between the support and bearing sections, and from there, to the space between the bearing pads and the shaft surface. As the shaft rotates, the vibrations it produces are damped in two concurrent ways, first by the shaft squeezing the fluid between the pads and the bearing sections and between the bearing sections and the support; and secondly, by overcoming the inertia of the fluid, pads and bearing sections. The forces thus generated are dissipated from the system in this manner with the result that the shaft vibrations are effectively damped during operation.

---

This invention relates to fluid lubricated bearings for a rotatable element such as a shaft, and particularly to bearings which will damp vibrations of the shaft as the shaft rotates.

It is extremely difficult to machine and locate, relatively to one another, a rotatable shaft and a bearing for it with such accuracy that, when the shaft rotates at relatively high speeds, it will not vibrate.

An object of this invention is to provide a bearing for a rotatable element such as a shaft, which may be fluid lubricated, which will damp vibrations of the shaft during shaft rotation, which has freedom to align with the shaft position, with which the magnitude of the damping of the shaft vibrations will be a function of mass sleeve geometry, clearance and fluid and pressure levels, which will operate successfully at safe, normal temperatures, and which will be relatively simple, practical, efficient, durable and inexpensive.

Other objects and advantages will appear from the following description of some examples of the invention, and the novel features will be pointed out in connection with the appended claims.

In the accompanying drawing

FIG. 1 is a schematic diagram for use in explaining the principle of operation of the invention;

FIG. 2 is a sectional elevation of a shaft and a bearing for it in accordance with this invention;

FIG. 2a illustrates the arrangement of restricted orifices in the bearing pads of FIG. 2.

FIG. 3 is a similar sectional elevation but illustrating another embodiment of the bearing;

FIG. 4 is a sectional elevation of certain details of FIG. 3, but modified slightly;

FIG. 5 is a sectional elevation illustrating another embodiment of the invention;

FIG. 6 is a diagram illustrating the variation in the pressure of the fluid film between the support and the bearing unit;

FIG. 7 is a diagram illustration of the pressure of the film fluid between the shaft and the bearing unit;

FIG. 8 is a sectional elevation, similar to FIG. 5, but illustrating still another embodiment of the invention;

FIG. 9 is a diagram illustrating pressure variations in the squeeze film of FIG. 8 between a bearing unit and its support;

FIG. 10 is a sectional elevation of a shaft and a bearing unit illustrating another embodiment of the invention;

FIG. 11 is a diagram illustrating fluid pressures in a fluid film.

Figure 12:
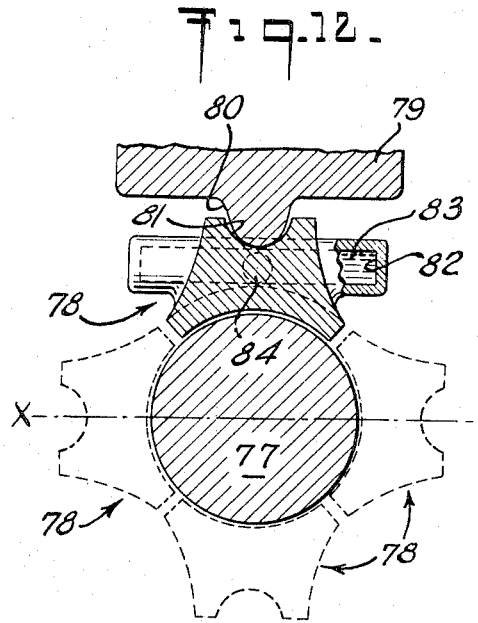
FIG. 12 is a transverse sectional elevation of a shaft and bearing illustrating still another embodiment of the invention.

This invention damps the vibrations of the shaft durings its rotation by converting the forces exerted on the bearing by an unbalanced shaft, with another form of energy which is absorbed or dissipated. This conversion is by using inertia elements and compression and displacement of a lubricant to absorb the energy of the vibrations.

Referring first to the diagram in FIG. 1, let it be assumed that the part $W_2$ represents the mass of the rotatable shaft, that $W_1$ represents the mass of an inertia element interposed between the shaft and a support S, that $K_1$ represents a fluid interposed between the inertia element $W_1$ and the support S, and that $K_2$ represents another fluid interposed between the shaft mass $W_2$ and the inertia element $W_1$. Now if the mass $W_2$ moves upward in FIG. 1 toward the inertia element $W_1$, it will compress the fluid $K_2$ between them and displace it. This resistance to displacement and compression offered by the film $K_2$ tends to resist this upward movement of the shaft mass $W_2$ and hence acts somewhat like a dashpot, represented diagrammatically by $R_2$, that resists such movement of the shaft.

The compression of the fluid film $K_2$ between the shaft mass $W_2$ and inertia element $W_1$, which may be a bearing pad for the shaft with a lubricating fluid $K_2$ between them, is not only resisted by the force necessary to displace the compressed fluid in a direction sidewise from between the pad and shaft, but the mass of the pad which is free to move in the same direction, is an inertia element that takes up energy from the compressed film that is required to overcome inertia of the pad and set it into motion. This further takes up some of the force from the shaft. Then the movement of inertia mass $W_1$, as just explained, causes compression of the film $K_1$ between the inertia element or bearing pad and the support with resulting displacement of film $K_1$ from between element $W_1$ and the support. This takes up more of the energy that is created by the upward movement of shaft mass $W_2$ in FIG. 1 and also, this action is something like that of a dashpot $R_1$ that resists approach of inertia element $W_1$ towards the support S. Thus, when $W_2$ is a shaft moving upward in FIG. 1, it causes compression of the lubricating film between it and the bearing pad or unit $W_1$, and the resulting pressure on unit $W_1$ causes the latter to resist by inertia of its mass and compression of the second lubricating film between the unit $W_1$ and the support S. This combination of forces that compresses the two films of fluid and overcomes the inertia of the bearing unit serves to resist such movement of the shaft, and these forces tend to damp such forces from the shaft, that may be forces caused by vibration of the shaft as it rotates. Such forces of rotation may also be resisted or damped by the use of other masses mounted, yieldingly or resiliently, on the bearing unit and acting as inertia elements to absorb the forces imparted to the bearing unit by the shaft in its vibrations, these bearing units are arranged in sequence around the periphery of the shaft so as to resist and damp vibrations in all radial directions.

The other figures of the drawing illustrate a number of ways by which the principles explained in connection with FIG. 1 may be applied to actual bearings. Referring next to the embodiment of the invention illustrated in FIG. 2, the rotatable shaft 1 is mounted to rotate between a plurality of individual bearing units 2 that are arranged in sequence around the circumference of the shaft and held in place by a support 3 that may be a housing into or through which the shaft passes but is a fixed part relatively to the rotation of the shaft. Each bearing element or unit 2 in this embodiment is formed in two sections 2a and 2b, the section 2b serving as a bearing pad which has an arcuate face or surface 4 that fits and abuts local area or part of the circumference of the shaft. The other section of the bearing unit extends close to the support 3 and has a plurality of parallel pins 5 extending therefrom that are received in holes in the support. The faces or surfaces of the support and the section 2a which face one another are substantially equidistant across their entire opposed faces or surfaces and are preferably flat, so that a lubricating fluid may be interposed between them as will be explained later herein.

The two sections of the bearing unit have a limited, universal rocking engagement with one another where they abut and this is obtained by providing one of the sections with the convex shape 6 of an end segment of a sphere and the surface 7 of the other section which engages it with the shape concave end segment of a sphere that fits the convex segment of the sphere. The concave and convex spherical surfaces 6 and 7 that fit one another act like a ball and socket coupling between the two sections of the bearing unit and enable limited universal rocking of the pad section 2b on the section 2a, as it is necessary to permit the pad section 2b to adapt itself to any slight misalignment of the shaft, and have a film-like space of uniform thickness between the arcuate surface 4 and the circumference of the shaft.

A film of lubricating fluid, either a liquid or a gas, is continuously introduced under pressure to each unit between the abutting surfaces of the section 2a and the support 3, and between the shaft and the arcuate surface 4. For this purpose, the support 3 and the bearing unit 2 have cooperating and connecting passages which will now be described. The support 3 has a passage 8 leading outwardly and there formed for connection in any suitable manner to a source of lubricating fluid under pressure, either liquid or gas. The inner end of passage 8 opens through the flat surface of the support opposite an outwardly opening cavity 9 in the opposed flat surface of section 2a of the bearing unit 2. Branch passage 8a leads from passage 8 within the support, and a plurality of short restricted passage 10 lead from the branch passage 8a to the flat surface of the support at different local, interior areas of that flat surface. These short passages act as restricted orifices as they open through the flat surface of the support because such orifices are much smaller than the size of the branch passage. The branch passage, being larger in cross section, could be said to act somewhat as a plenum chamber insuring approximately equal rates of discharges through all of the restricted orifices.

The upper section 2a has a passage 11 that connects the plenum cavity or chamber 9 with the concave spherical surface 7 and partitions 12 are spaced apart along this passage 11 and have apertures that vary progressively in size from one end of passage 11 to the other. Whether the apertures increase or decrease in diameter will depend upon the engineering design. The convex surface 6 of the lower section 2b has a broad recess 13 that remains in communication with the lower end of passage 11 in all of the universal rockings between surfaces 6 and 7 and it acts like a small plenum chamber. A plurality of passages 14 extends from and opens into the cavity or recess 13, to local, spaced apart, interior areas of the bearing surface 4 that fits the shaft 1, so as to convey a lubricating fluid from recess 13 to discharge it through different interior areas of the bearing surface 4.

The lubricating fluid may be a liquid, but preferably it will be a lubricating gas supplied under pressure from a source, not shown, through this passage 8 which, at its outer end, is suitably formed for the making of such a connection to the said source. A gas has greater compressibility than a liquid and its compression alone absorbs energy without displacing it. The lubricant fluid passes through passages 8 and 8a and some is discharged through a plurality of restricted orifices 10 between the flat surfaces between the support and the upper unit section 2a where it forms a lubricating squeeze film that keeps such flat surfaces apart. Some of the lubricant fluid from passage 8 moves into the plenum recess 9 and along the passage 11 to the recess 13 where it divides and passes through the several small passages 14 and from the latter the fluid is discharged through restricted orifices 14a shown in FIG. 2a and flows into the space between the bearing pads and shaft 1 to provide a lubricating squeeze film under pressure between the shaft and a bearing unit. It is obvious the passages 14 themselves may be made of a sufficiently small size to serve the function of an orifice.

When the shaft 1 rotates while the lubricant fluid is supplied as explained, the shaft which is not perfectly balanced will tend to vibrate against one or more or even all of the individual bearing units 2. Each such vibration tends to squeeze the film of lubricant between the shaft and a bearing unit 2. This squeeze tends to force the fluid of the film sidewise out of the space between the shaft and that surface 4 of the bearing unit in question. This requires force and in extending this force, some of the energy of the vibration is absorbed and dissipated in another form of energy, which tends to damp the vibration of the shaft. During the pressure on this squeeze film of fluid, some of the pressure exerted on the fluid film was transmitted to the bearing unit and tends to force it radially away from the shaft during which the flat surface part of the upper section 2a is guided by pins 5 toward the flat surface on the support and thus compresses the other squeeze film of fluid between the flat surfaces. This compression tends to displace some of the interposed film which requires work and hence more energy of the vibration is absorbed as it was in the squeeze film between the shaft and the bearing unit 2.

In addition, force was required to move the bearing unit 2 in a direction radially outward from the shaft and the inertia of the bearing unit resisted this moving force. Hence, some of the energy of the vibration was absorbed and dissipated in overcoming the inertia of the bearing unit which tended to damp such vibrations of the shaft. All of these absorptions of energy by the films and the inertia of the bearing unit are effective in materially damping the vibrations of the shaft against one bearing unit, and since this occurs in each unit around the shaft, a substantial damping of vibrations of the shaft results.

Referring next to the embodiment of the invention shown in FIG. 3, the shaft 1 is disposed in a housing having a support 15 that corresponds to support 3 of FIG. 2. The bearing unit 16 is guided by pins 17 sliding in the support in a direction toward and from the shaft and is formed of two sections 16a and 16b, that are similar to sections 2a and 2b of FIG. 2. The support 15 has a passage 18 which is formed at its outer end for suitable connection to a source of lubricating fluid under pressure (not shown) and it extends to and opens through the flat surface 19 of the support which faces the opposing flat surface 20 of the bearing unit 2. Passage 18 has small short branches 21 that also open through restricted orifices 22 (not shown) in the interior areas of flat surface 19 and spaced well from the direct opening through surface 19 of the passage 18. Surrounding the direct opening of passage 18 through surface 19 is a peripherally continuous sealing ring 23, recessed into the surface 19 and yieldingly urged by an undulating ribbon spring 24 toward and into contact with the surface 20 where it prevents travel of lubricant fluid from the passage 18 directly to the local areas around orifices 22. These seal rings 23 have a narrow surface area contacting with surface 20 so that fluid pressure otherwise around the other faces of the ring will urge the ring into continuous contact with surface 20. The surface 20 of unit 16 opens into a passage 25 that is aligned with the opening of passage 18 of the support through surface 19 and this passage 25 opens into a circular groove 26 in the convex spherical surface 27 of the lower section 16b of the bearing unit. The groove 26 is wide enough to remain in communication with the passage 25 as the lower section 16b universally rocks on the upper section 16a. Small passages 28 lead from the groove 26 to spaced-apart local surface areas of the arcuate face 29 of the lower section 16b which fits against the shaft circumference, where they open through face 29 by restricted openings (not shown) or orifices 30. This provides a film of lubricating fluid under pressure between the shaft 1 and the bearing surface 29 of the bearing unit 16. The upper section has a downwardly-opening annular groove 31 surrounding and spaced from the groove 26, and an endless sealing ring 32 which slides in the groove into contact with the convex surface 27. An undulatory ribbon spring 33 disposed above the sealing ring urges it against convex surface 27. This prevents or limits leakage of lubricant fluid from groove 26 outwardly along the surface 27.

A hard button 34 is recessed into the concave surface of the upper section and takes much of the thrust, with minimum wear, from the convex surface 27 to the upper section 16a. The operation is basically the same as for FIG. 2, except that the sealing ring 23 serves to limit spread of the fluid along the surfaces 19 and 20 from the direct opening from passage 18, and the ring 32 limits loss of fluid from groove 26.

Referring next to FIG. 4, the detail indicates the hard wear button 34 of FIG. 3 is replaced by a similar button 36 that has a concave surface 36a which fits and bears upon the convex surface 27 of the lower bearing section 16b.

Referring next to FIG. 5, the embodiment illustrated employs a single, cylindrical bearing sleeve 37 having a passage 39 through which the shaft 38 extends and which provides a rotatable support for the shaft. This sleeve 37 has a boss 40 encircling it, whose surface 41 corresponds to a peripherally extending band of a sphere. A support 42 surrounds the sleeve 37 and has a concave bearing surface 43 which mates with and fits the surface 41 of sleeve 37. Machine screws 44 removably secure the support 42 to a frame 45. The frame has a passage 46 that is connected to a source of lubricating fluid or gas (not shown) under pressure, which opens through the face of the frame to which the support 42 is secured into a passage 47 in support 42. This passage 47 extends in a direction radially of the shaft and opens into an annular groove 48 in the concave bearing surface 43. The passage 47 has branches that open through ports 49 into the concave bearing surface 43 at areas between the groove 48 and the periphery of the concave surface 43 to supply bearing fluid to the surface 43.

The boss 40 on the sleeve 37 has a passage 50 that extends from the convex face 41 opposite from the groove 48, with which it communicates, in a direction radially of the shaft and then terminates in a plurality of branch passages 51 that are parallel to the axis of the shaft 38, and about six or eight of them arranged in spaced succession around the shaft. Each passage 51 has short branch passages 52 that open through the bearing face 39 of the sleeve at intervals spaced apart and arranged along the axial length of the surface 39. The passage 50 has a plurality of spaced-apart walls 53 arranged in succession along it, and each wall apertured, with the apertures increasing progressively in diameter along it toward the shaft 38. A pin 54 is provided in the support 47 to extend in a direction radially of the shaft loosely into a recess in the boss 40 to prevent rotation of the sleeve 37 with the shaft when the latter is rotating.

When a lubricating fluid, such as a lubricating gas, is supported under pressure through passage 46, it will pass along passage 47, some of it through ports 49 and annular groove 48 to lubricate the bearing surfaces 41 and 43, and the balance through passages 50, 51 and 52 into the bearing of surface 39 on the shaft 38 at intervals along it and also at intervals around the shaft. The nature of the bearing pressures between surfaces 41 and 43 are shown schematically by the graph in FIG. 6, and the nature of the bearing pressures between the shaft and surface 39 of the sleeve are shown schematically by the graph in FIG. 7.

The cross-hatched areas in these graphs in FIGS. 6 and 7 indicate the possible change in the lifting forces as the clearance is changed from one area to another, i.e. flow changes as the damping film orifice area is changed in comparison to bearing unit motion and shaft motion.

In the embodiment of the invention illustrated in FIG. 8, the bearing unit 54 is arranged circumferentially about the shaft 55. This unit has a cylindrical surface 56 that fits the shaft surface, and also has a boss 57 with a convex bearing surface 58 that corresponds to a peripheral band or segment of a sphere. This boss has universal rocking in a concave recess 59 of support 60, which fits the convex surface 48 and enables limited universal rocking of boss 57 in the recess 59 of the support. The support 60 has therein a passage 61 formed at its outer end 62 for connection to a source (not shown) of lubricating fluid, preferably gaseous. Within the support, the passage 61 has branches 63 that are arranged at spaced-apart intervals around the shaft and each of which extends to and opens through restricted orifices 64 (not shown) in the concave surface 59 of the recess in which boss 57 rocks. These orifices are spaced from one another and all are in the interior areas of surface 59. Around its peripheral margin, the surface 59 has an annular groove 65 in which an endless sealing ring 66 is disposed to slide into contact, at its outer edge, with the convex surface 58 and prevent escape of lubricating fluid outwardly. The inner end face of the ring 66 is exposed to pressure of the lubricating fluid which presses it against convex surface 58. A ribbon, undulating spring, like spring 24 of FIG. 3, may be used behind the sealing ring to urge the sealing ring against surface 58. This sealing ring limits leakage of the lubricating film which is important when the fluid is a gas.

The passage 61 extends to concave surface 59 and opens into it at a recess 67 at about the center of surface 59. The bearing unit 54 has a passage 68 that extends in a direction radially of the shaft 55, from its convex surface 58 in alignment with recess 67 to proximity but short of the surface that fits said shaft, and there it has branches 69 that are arranged in spaced-apart relation around the shaft and extend in directions parallel to the shaft axis. These branches discharge through a plurality of restricted orifices 70 (not shown) through the face that fits the shaft 55 in interior local areas of such face that fits the shaft. The passage 68 has spaced apart along it a plurality of apertured partitions 71, the apertures of which vary progressively in size from one end to the other of the group. The increase or decrease in the sizes of these apertures depends upon engineering requirements. The end of the passage 68 which is nearest to the surface 56 of the bearing unit has a small vent passage 72 that leads to an annular groove or channel 73 in which is fitted a sealing ring 74 that contacts the convex surface 59. Ring 74 is pressed against surface 59 by fluid pressure and also by a corrugated leaf spring (not shown) corresponding to spring 33 of FIG. 3.

When the passage 62 is connected to a source (not shown) of lubricating fluid under pressure, preferably a lubricating gas, some of the fluid will pass passages 61 and 63 into the space between the convex surface 58 and the concave surface 59 to provide a squeeze fluid film between those surfaces, leakage being limited by the sealing ring 66 around the periphery and by the size and pressure of the vent 72. The fluid pressure in this film will vary from a very low near the sealing ring 66 to a maximum at the orifices 64 and then fall somewhat to an intermediate pressure at the recess 67 identified in FIG. 9 as PB. The line A in the graph of FIG. 9 illustrates the variation in the fluid pressure on this fluid squeeze film. Some of the fluid from passage 62 and recess 67 will pass along passage 68 and be discharged through branch passages 69 and orifice 70 to create a lubricating fluid squeeze film between the shaft and bearing unit surface 56, the amount of the pressure being controlled to some extent by the size of the vent 72 and the bearing pressure PB. In FIG. 9, the line 13 illustrates the variations in the fluid pressure along the shaft 55.

The construction of FIG. 8 is more complicated than that of FIGS. 1–5, since it has the feature of the seal rings which can reduce the gas flow to the damping film, but at the expense of mechanical complication. It will have a relatively high film stiffness in the damper film. The design of FIG. 5 is relatively simple, in that it has relatively few parts, but its damper film stiffness and gas consumption are rather low.

Referring next to FIG. 10, the construction is similar to those disclosed in FIG. 8, except that the vent passage 72, the sealing ring 66 and the apertured partitions 72 of FIG. 8 have been omitted, and vent passages 75 added to the support to head from an annular groove 76 in the concave surfaces 59 between the restricted orifices 64 and to center recess 67. Functionally corresponding parts in FIGS. 8 and 10 carry the same reference numerals. The graph in FIG. 11 shows the pressure on the fluid film between the peripheral margin of concave surface 59 and the central recess 67. The pressure rises from a low close to such margin to a peak at the restricted orifice, then falls to the same low at vent 75, then rises to the full pressure at the recess 67. In this construction, the lifting force is increased but at the expense of gas flow. It is a very simple bearing mechanically, but it is very wasteful of gas or fluid, since the damping film between the support and the bearing unit exhausts to the ambient or atmospheric pressure. It has medium damper film stiffness.

Figure 13:
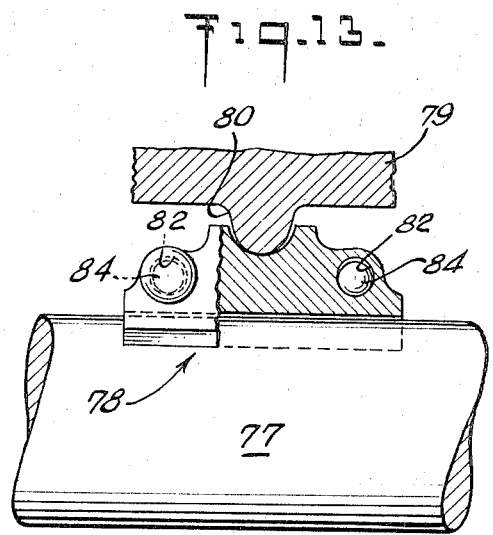
FIG. 13 is a longitudinal sectional elevation of the same.

In the embodiment of the invention illustrated in FIGS. 12 and 13, the shaft 77 is encircled by a plurality of bearing units 78. Each of these has a universal rocking engagement with the support 79, by means of a boss 80 on the support, which is of the shape of an end segment of a sphere that rides in a concave recess 81 in the outer face of a unit 78. Each unit 78 at each side of the recess 81, has a cylindrical passage 82 that extends in a direction crosswise of the length of the shaft which contains a liquid 83 that largely or substantially entirely fills it, except sufficient gas to allow exhaustion and contraction of the liquid with changes in the temperature of the liquid; however, a ball 84 is disposed in the liquid and is of a size to move freely along the passage 82, except for the resistance offered by the liquid 83 to such movement. Since all of the units around the shaft have such tubes similarly mounted on the units, energy imparted to any unit that is exerted in a direction crosswise of the shaft will be absorbed somewhat and damped by the inertia of a ball as it rolls along its tube, restricted by the liquid 83. The axis of each cylindrical passage 82 is shown on the "X" or transverse axis, but it can be put on all or any of the three coordinate axes of the shaft.

Figure 14:
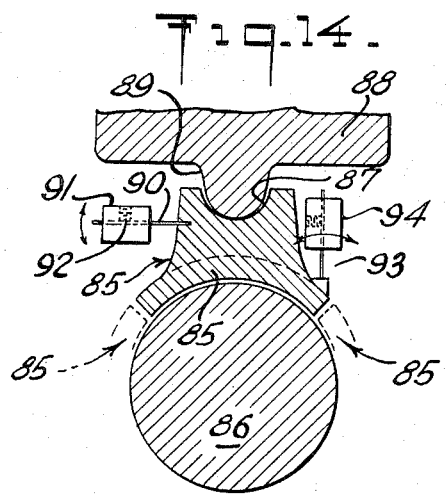
FIG. 14 is a transverse sectional elevation of a shaft and bearing illustrating another embodiment of the invention.

Referring next to the embodiment of the invention shown in FIG. 14, a plurality of bearing units 85 is arranged in spaced relation to one another around the circumference of the shaft 86 to provide a bearing for the shaft in its rotation. Each unit 85 has a concave cavity 87 in its outer face which corresponds to the surface of an end segment of a sphere, and the support 88 has a convex boss 89 that fits the cavity 87 and with it forms a limited universal rocking support for the bearing unit or element. To absorb the damp vibrations of the shaft 86, the bearing unit or element 85 mounts a plurality of inertia elements that respond to vibrations or forces from different directions, caused by any unbalance of the shaft. A flat, ribbon-like spring arm 90 is secured rigidly at one end to one side of the element 85 and an inertia mass or weight 91 is secured on the spring arm 90 away from its secured end by a set screw 92 or other means enabling the weight 91 to be adjusted to and held in, different selected positions along the arm 90. The spring arm 90 is disposed to flex in a direction generally towards and from the shaft 86 and thus absorb somewhat and damp vibrations to the shaft that are imparted to the bearing element in a direction generally radially of the shaft. Another flat, ribbon-shaped, spring arm 93 is fixed at one end to the element 85, preferably at the opposite side from the arm 90 and it extends in a direction away from the shaft, with its faces generally parallel to the axis of rotation of the shaft, and flexing in a direction at about a right angle to the direction of flexing of the arm 90. Another mass or inertia element 94 is similarly secured in adjusted positions on the arm 93 away from the secured end of the arm 93. If the shaft 86 vibrates during its rotation, the inertia mass or weight 91 will cause arm 90 to flex or vibrate in directions generally toward and from the shaft and tend to absorb and damp the radial components of the forces caused by the vibration of the shaft. The mass 94 will tend to absorb and damp the components of the vibration forces that are parallel to a tangent to the shaft circumference. By adjusting the inertia elements or masses 91 and 94 along their supporting spring arms enbles one to vary the frequencies of the vibrations of the shaft to which they most readily respond. This is a sort of tuning of the inertia elements.

Figure 15:
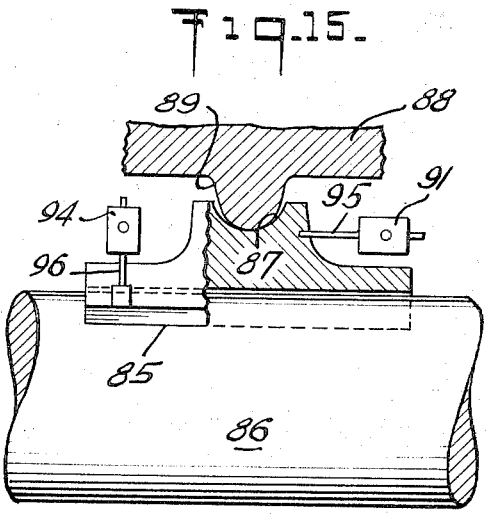
FIG. 15 is a longitudinal sectional elevation of another embodiment of the invention.

In the embodiment of the invention illustrated in FIG. 15, the construction is similar to that of FIG. 14, except that the flat spring arms 90 and 93 of FIG. 14 are replaced by cylindrical spring rods 95 and 96 respectively and the rods 95 and 96 will flex sidewise in all directions and hence are more effective in absorbing and damping vibrations of the shaft 86. With the use of the cylindrical spring rods, one element will have a flexing constant in all transverse directions and will resist all motions in the X and Z coordinates and the other rod will tend to damp motions in the Z coordinate.

It will be understood that various changes in the details, materials and arrangements of parts which have been herein described and illustrated in connection with the different embodiments of the invention, in order to explain the nature of the invention, may be made by those skilled in the art within the principle and scope of the invention as expressed in the appended claims.

I claim:
1. A hydrostatic bearing for a rotatable shaft which comprises:
   (a) a shaft,
   (b) a support,
   (c) a plurality of bearing units arranged in peripherally spaced sequence around the shaft, interposed between said shaft and said support, and together rotatably supporting said shaft,
   (d) each unit having
      (1) a bearing pad fitting an arcuate portion of the circumference of the shaft,
      (2) a member interposed between each pad and said support, and guided by said support for limited movement in directions toward and from and radially of said shaft.

(3) said member and pad having interfitting spherical segment faces, one of which faces is convex and the other of which is concave, and together forming a limited universal connection of said pad and said member, (4) one of said pad member having a cavity in the interior area of its said interfitting face, (5) said pad having a plurality of passages leading from its said face at said cavity to the interior area of the surface of said pad which fits said shaft and there terminating in a plurality of spaced apart restricted orifices, (6) said member and support having between them a very thin but broad space of approximately uniform thickness, (7) said support having a passage formed at one end for connection to a source of lubricating fluid under pressure and opening into the interior area of its face forming one side of said thin space in a plurality of spaced apart restricted orifices and one larger orfice, (8) said member having a passage therethrough from said thin space to its opposite face where it communicates with said cavity, (e) whereby, when lubricating fluid under pressure from said source may pass into said thin space, it will form a squeeze film and when some passes into the space between the pad and the shaft it will form a lubricating film between them.

2. The bearing according to claim 1, wherein said passage through said member has along it a plurality of restrictions of progressively varying sizes.

3. The bearing according to claim 1, wherein said cavity in said one of said faces is of sufficient volume to act as a plenum chamber when lubricant is a gas.

4. A hydrostatic bearing for a rotatable shaft, which comprises:

(a) a shaft,
(b) a support,
(c) a plurality of bearing units arranged in peripherally spaced sequence around the shaft, interposed between said shaft and said support, and together rotatably supporting said shaft,
(d) each unit having
(1) a bearing pad with a concave face fitting and bearing against a peripheral portion of said shaft,
(2) a member interposed between said pad and support and guided by said support for limited movement in a direction radially of said shaft,
(3) said member and support having opposed faces separated by a thin space,
(4) said pad and member having abutting and fitting spherical segment surfaces providing for limited universal rocking of said pad on said member,
(5) said support having a passage therethrough, formed at one end for connection to a source of lubricating fluid under pressure, and opening outwardly in the interior area of said thin space through a plurality of spaced-apart, restricted orifices, and also through a larger orifice,
(6) said member having a passage therethrough and communicating at one end with said larger orifice and at its other end with its spherical segment surface,
(7) said pad having therein passage means communicating at its said spherical surface with said passage of said member and opening through the interior of its face that fits said shaft in a plurality of spaced-apart restricted orifices, (e) whereby, when a lubricating fluid under pressure from said source passes into the passage of said support and through it and the member to the pad, it can escape from the unit as squeeze films between the support and the member and between the pad and the shaft and provide lubrication for the shaft during its rotation and also two elastic vibration-damping films between the shaft and the support.

5. A hydrostatic, lubricated bearing for a rotatable shaft, which comprises:

(a) a shaft,
(b) a support,
(c) a plurality of bearing units arranged in sequence peripherally around the shaft and together rotatably supporting said shaft,
(d) each unit having:
(1) a bearing pad fitting an arcuate portion of the periphery of said shaft,
(2) a member interposed between the pad and the support and having limited universal rocking engagement with said pad, and guided by said support for limited movement in a direction radially of the shaft,
(3) said support and member having a thin space between their adjacent faces,
(4) said support, member and pad having communicating passages for delivering a lubricating fluid under pressure as squeeze films between the pad and shaft and between said member and said support.

6. A hydrostatic, lubricated bearing for a rotatable shaft, which comprises:

(a) a shaft,
(b) a support,
(c) a plurality of bearing units arranged in spaced-apart sequence about said shaft,
(d) each unit having:
(1) a bearing pad fitting an arcuate portion of the periphery of said shaft,
(2) an inertia member interposed between said pad and said support by said support for limited movement, and guided toward and from said shaft, and having limited universal rocking engagement with said pad,
(3) said support, pad and inertia member having cooperating means for delivering a lubricating fluid under pressure to spaced-apart interior areas of the face of said pad that fits said shaft to create a squeeze film of the lubricating fluid between the pad and shaft, and also for applying a lubricating squeeze film of said fluid between said member and said support.

7. A hydrostatic, lubricated bearing for a rotatable shaft, which comprises:

(a) a shaft,
(b) a support,
(c) bearing pads arranged around the periphery of the shaft and having faces fitting peripherally arcuate portions of said shaft,
(d) an interposed member between each pad and said support and having a universal rocking contact with said pad,
(e) said support, member and pad having passage means opening through restricted orifices in the interior area of said pad face, and into the space between said member and support, and whereby when said passage means is supplied with a lubricating fluid under pressure, and delivered as films between said support and said member, and between each pad and said shaft, said fluid films will damp vibrations of said shaft during rotation of said shaft.

8. A hydrostatic fluid-lubricated bearing for a rotatable shaft which comprises:

(a) a shaft,
(b) a support,
(c) a plurality of bearing units arranged in sequence around the periphery of the shaft, together rotatably supporting said shaft and each having a face fitting an arcuate area of said shaft,
(d) said support and each unit having cooperating means for guiding that unit toward and from the shaft and between them having broad surfaces facing each other and approximately equi-distant apart over their broad surfaces,
(e) said support and each unit having passages leading to the interior of one of such surface areas and there opening through that surface area in a plurality of restricted orifices, and also to the interior area of said unit face that fits said shaft and there opening through that face in restricted orifices,
(f) whereby when a source of lubricant fluid under pressure is connected to said passages, a thin squeeze film of lubricant fluid will be created and maintained between said broad surfaces and between said shaft and the unit face which fits the shaft.

9. The bearing according to claim 8, wherein each unit is formed of two sections rockable on one another universally to a limited extent between the face that fits the shaft and the face that faces said support.

10. A bearing for rotatably supporting, and damping the vibration of, a shaft, which comprises:
(a) a support,
(b) a shaft,
(c) a plurality of bearing units arranged in sequence completely around the circumference of said shaft each fitting and engaging a local area of the shaft with a film space between them,
(d) each unit and said support having a film space between them of approximately uniform thickness that is crosswise of and intersected by an extended radius of the shaft,
(e) said support and each unit having passages by which fluid under pressure may be delivered through restricted orifices into the interior areas of said film space between the support and unit,
(f) said unit having passages by which a lubricating fluid under pressure may be delivered through restricted orifices into the interior areas of its face which fits said shaft,
(g) whereby said fluid films between said support and said unit, and between said shaft and each unit, when compressed through vibrations of said shaft will damp such vibrations of the shaft and the mass of each unit will act as an inertia element and also absorb vibratory energy from the shaft and damp the shaft vibrations.

11. A bearing for rotatably supporting, and damping the vibration of, a shaft which comprises:
(a) a shaft,
(b) a support encircling and spaced from said shaft,
(c) a plurality of inertia elements arranged in sequence around the circumference of said shaft,
(d) said support and each element having cooperating parts that guide that element for movements of translation toward and from said shaft and also having relatively broad, opposed surfaces, approximately equally distant apart across surfaces, that approach and separate as the element moves toward and from said shaft,
(e) a bearing pad interposed between each element and said shaft, with a universal rocking contact with said element, and having an arcuate face fitting a local area of said shaft,
(f) said support having passages opening as a plurality of spaced-apart, restricted orifices through the interior area of its said broad surface,
(g) said pad having passages opening as a plurality of restricted orifices through the interior area of said arcuate face,
(h) whereby when a lubricating fluid under pressure is supplied to said passage, it will form squeeze films of said fluid between said support and said element, and between said pad and said shaft, which films when compressed by vibrations from said shaft to said pad and from said pad to said element, will exert a vibration damping action on said shaft.

12. A bearing device for a rotatable shaft, which comprises:
(a) a support,
(b) a plurality of bearing elements arranged around the circumference of the shaft and each fitting a local area of said shaft,
(c) each element having a universal rocking connection to said support, and
(d) inertia means mounted on each element for limited back and forth movement caused by vibrations imparted to said element by said shaft,
(e) whereby movements of said inertia means will absorb the vibration energy imparted to it by said shaft and thus damp such shaft vibrations.

13. The device according to claim 12, wherein said inertia means includes a mass mounted for limited movements, with yieldable resistance to such movements.

14. The device according to claim 12, wherein each said inertia means includes a closed chamber, a body loosely movable along said chamber, and a fluid in said chamber resisting movement of said body along said chamber.

15. The device according to claim 12, wherein each said inertia means includes a mass having a resilient coupling to a related element that urges said mass to a normal intermediate position from which it is displaced by vibrations of the element received from said shaft.

16. The device according to claim 12, wherein each said inertia means includes a resilient, flexible member secured at one end to said element and carrying a mass remote from said one end.

17. The device according to claim 12, wherein each said intertia means includes a ribbon-shaped spring secured at one end to said element and carrying an inertia mass remote from said one end.

18. The device according to claim 12, wherein each said inertia means includes a plurality of ribbon-shaped springs, each secured at one end to said element and carrying an inertia mass remote from said one end, said springs being disposed to flex in different directions and thus absorb and damp vibrations in different directions as received from said shaft.

References Cited

UNITED STATES PATENTS 989,958   4/1911   Frahm _____ 74—574

FOREIGN PATENTS 845,793   8/1960   Great Britain.

MARTIN P. SCHWADRON, *Primary Examiner.*

FRANK SUSKO, *Examiner.*